(12) United States Patent
Warn

(10) Patent No.: US 8,149,134 B2
(45) Date of Patent: Apr. 3, 2012

(54) SYSTEM FOR PROVIDING UTILITY MONITORING

(76) Inventor: Walter E. Warn, Knightdale, NC (US)

( * ) Notice: Subject to any disclaimer, the term of this patent is extended or adjusted under 35 U.S.C. 154(b) by 563 days.

(21) Appl. No.: 12/370,295

(22) Filed: Feb. 12, 2009

(65) Prior Publication Data

US 2010/0201541 A1 Aug. 12, 2010

(51) Int. Cl.
G08C 19/22 (2006.01)
(52) U.S. Cl. ............... 340/870.02; 340/870.07
(58) Field of Classification Search ............ 340/870.02, 340/870.01, 870.07
See application file for complete search history.

(56) References Cited

U.S. PATENT DOCUMENTS

| | | | |
|---|---|---|---|
| 3,852,726 A | 12/1974 | Romanelli | |
| 3,974,694 A | 8/1976 | Eberle | |
| 3,992,705 A | 11/1976 | Langenfeld | |
| 4,004,097 A | 1/1977 | Spaulding | |
| 4,250,352 A | 2/1981 | Workman, Sr. | |
| 4,296,411 A | 10/1981 | Romanelli | |
| 5,721,383 A | 2/1998 | Franklin | |
| 5,764,158 A | 6/1998 | Franklin | |
| 5,767,790 A | 6/1998 | Jovellana | |
| 5,986,573 A | 11/1999 | Franklin | |
| 6,836,737 B2 | 12/2004 | Petite | |
| 7,360,413 B2 | 4/2008 | Jeffries | |
| 2006/0245467 A1* | 11/2006 | Casella et al. | 374/41 |
| 2009/0146839 A1* | 6/2009 | Reddy et al. | 340/870.02 |

OTHER PUBLICATIONS

Continental Control Systems, Advanced Pulse WattNode, Pulse Output WattNode AC Electric Power and Energy Meter, http://www.ccontrolsys.com/products/, 2008, US.
NORGAS, Gallus 2000, Gas Sub-Meter, wwwnorgas.com, US.
Meter Meister, Meter Meister Installation, Operation and Programming, Sep. 9, 2008, US.

* cited by examiner

Primary Examiner — Danny Nguyen
(74) Attorney, Agent, or Firm — James G. Passé; Passé Intellectual Property, LLC

(57) ABSTRACT

The present invention relates to a means for monitoring the utility usage in a building with individual units but serviced by a single utility company meter. The individual units receive a pulse flow meter which is hard wired to a central unit and then sent to the internet for reading and then splitting the utility bill into prorated utility bills based on actual usage rather than size of the individual unit as a percentage of the whole unit.

20 Claims, 2 Drawing Sheets

SYSTEM FOR PROVIDING UTILITY MONITORING

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a method and apparatus for metering water usage in a commercial structure by individually monitoring each units within the structure and optionally sending the information to the internet for reading.

2. Description of Related Art

The metering of large commercial buildings, such as a large industrial building with individual bays each bay leased or owned by a different entity, has been accomplished mainly by a single meter and the usage divided amongst the users of the building. It has been impractical in many cases to place individual meters on each unit because of the frequent combining and separating of the units merely by erecting walls.

Normally when the single metered building receives a water, gas or electric bill, the owner or manager of the building divides the bill based on the square feet occupied by each of the tenants within the building. While a prorated means of apportionment is considered fair within the trade it is not reflective of the actual utility usage of each of the tenants and some tenants may be subsidizing other tenant's high usage.

Individual meters can be installed in each unit but meters from the utility company are relatively expensive and frequent changes in the operative size of the buildings leads to frequent changes of utility company meters and thus a high cost associated with that approach.

Some approaches have been used in situations where for water utilities plumbing in a building is extremely complex. In U.S. Pat. No. 5,986,573 Issued Nov. 16, 1999 to Franklin et al. there is disclosed a method and apparatus for metering building structures with a plurality of service outlets each having control valves having a transmission system for wirelessly sending signal from each of the meters. Once again the cost of such a system is extremely high on a per unit basis since a transmitter is necessary for each meter and is impractical in all except high end applications.

BRIEF SUMMARY OF THE INVENTION

The present invention is an apparatus and method for measuring the utility usage of individualized units within a commercial building where a single utility meter services those individualized units.

In one version the present invention there is a method for metering utility consumption in a single building, serviced by a single utility meter, for each of a plurality of individual units within the building comprising:
a) identifying each of the individual units to be metered in the building;
b) connecting a pulse flow meter to each identified unit the flow meter capable of continuously sending a flow data signal via a wire;
c) connecting a receiving device at the building for receiving the flow data signal via the wire from each of the identified individual units and storing the data in the receiving device for each of the individual units;
d) a means in the receiving device for reading the data from a selected identified unit by a receiving device user.

In another embodiment of the invention there is an apparatus for metering the utility consumption in a single building, serviced by a single utility meter, for each of a plurality of individual units within the building comprising:
a) a plurality of pulse flow meters capable of sending flow data via a wire wherein there is one flow meter per individual unit;
b) a single receiving device for receiving flow data from each of the individual unit flow meters, capable of receiving the flow data signal via the wire from each of the identified individual units and storing the data in the receiving device for each of the individual units;
c) a means within the receiving device for storing the flow data and reading the flow data by a receiving device user.

In yet another embodiment, there is a system for monitoring the utility usage in a plurality of individual units within a single building metered by a utility meter comprising:
a) a building metered by a single utility meter and having a plurality of individual units;
b) a plurality of pulse flow meters capable of sending flow data via a wire wherein there is one flow meter per individual unit;
c) a single receiving device for receiving flow data from each of the individual unit flow meters, capable of receiving the flow data signal via the wire from each of the identified individual units and storing the data in the receiving device for each of the individual units;
d) a means within the receiving device for storing the flow data and reading the flow data by a receiving device user;
e) a means for prorating utility usage measured by the utility meter to each of the individual units.

DETAILED DESCRIPTION OF THE INVENTION

Figure 1:
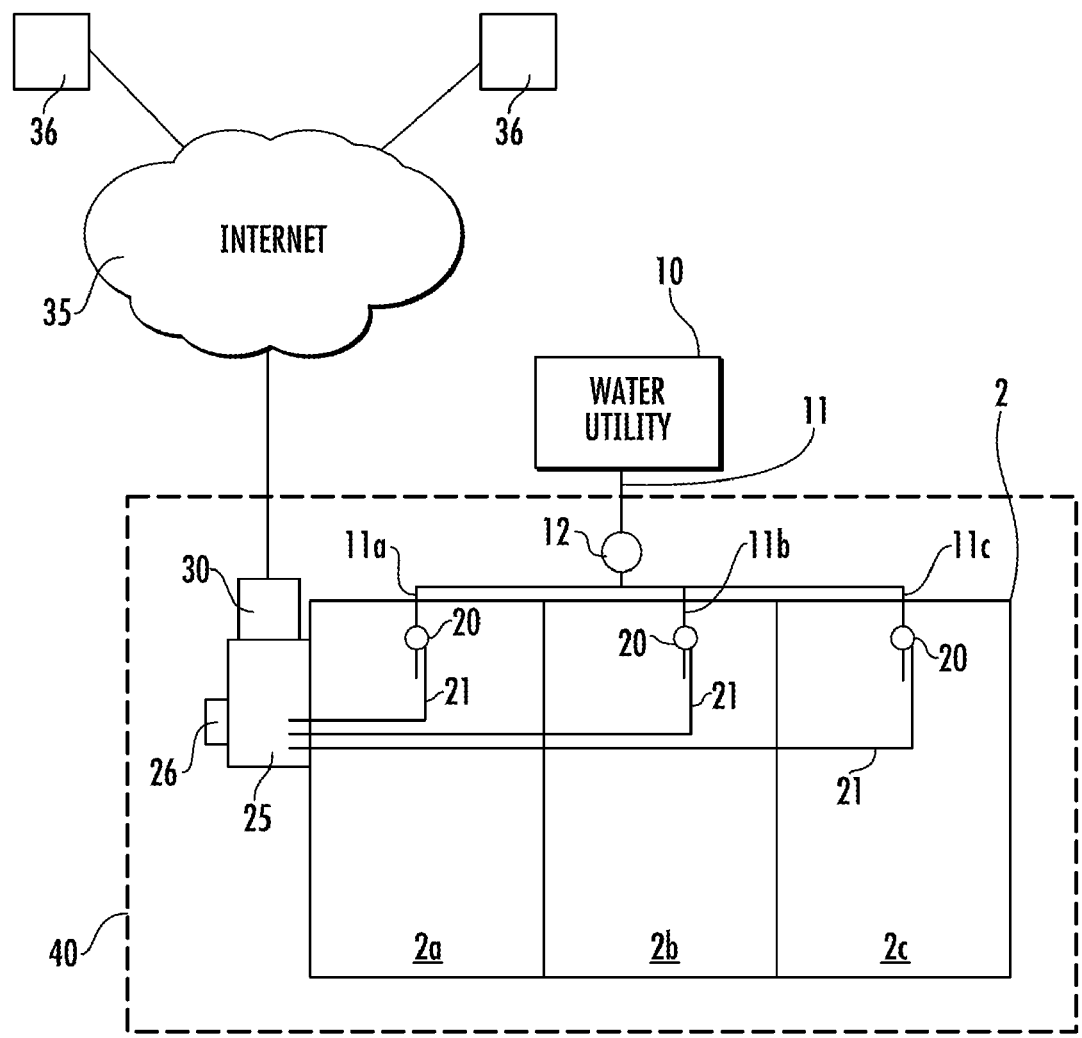
FIG. 1 is a schematic diagram of the construction of the present invention and system within a building.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "utility" refers to the provision of water, gas or electric services to a particular building. While references may be made to a particular utility where applicable the substitution of individual utilities or multiple utilizes is intended within the scope of the present invention.

As used herein the term "single building" refers to a commercial building wherein there is a plurality of users, owners, leasers or the like, each taking a portion of the building and receiving utility service. The building will have a single utility meter servicing the building from the utility company and a divider pipe or wire providing individualized utility to each of the plurality of users, owners, leasers or the like, each of which occupies an "individual unit" within the building.

By use of the phrase "flow meters" herein refers to a meter for measuring the amount of water passing a particular point and sending a data signal as to the amount of water flowing via a wire connection. One flow meter per unit is utilized in the practice of the invention. While any flow meter having a wire connection may be used in the practice of the invention one embodiment comprises a pulse flow meter. These meters are relatively cost effective and easy to install. They can be purchased at most any meter store and are available for gas, water and electric services. In the practice of the invention there can be 2 or more but versions where there are 3, 4, 5, 6, 7, 8 or more meters per system of the invention or per building is certainly within the scope of the invention.

By "receiving device" refers to a single device for receiving each of the data signals from each of the individual units via a plurality of wires. The receiving device will have a connection for each of the wires from each of the plurality of flow meters of the present invention. The receiving device will have appropriate memory and processing capability such that the receiving device can individually store each of the data signals from each of the individual unit flow meters. In addition to storing the data the receiving device will have appropriate means for reading the data for a selected unit. A readout screen and appropriate buttons, or the like, can be used by an individual accessing the device and reading the flow of any selected flow meter.

In addition, the receiving device can comprise a means for hooking up to a network. The connection would be such that the stored data and the ability to read the data for each individual unit would then be transferred to the network for reading via a network reader. In some embodiments, the network is the internet and one could read the stored data on the receiving device by accessing the device on the internet. In yet other embodiments, all or some of the functions of the receiving device can be accessed or operated via the network or internet connection.

The receiving device in some embodiments can have additional controls, for example, zeroing out values in the stored data setting time date, a password for the device or individual units and the like. In one embodiment, there is a means either in the receiving device on the internet, or otherwise, which takes the total amount of water usage from the utility meter or elsewhere (such as adding up all the individual units and prorates the water bill based on each individualized units proportion of all the utility used in the measured building. The stored data regarding the proration can then be used to calculate the individualized unit's portion of the monthly utility bill.

Now referring to the drawings FIG. 1 is a diagram of an embodiment of the apparatus of the present invention. In this view commercial building 2 comprises 3 individual units 2a, 2b and 2c. While 3 units are represented, any number of units could be part of the apparatus. Each of these units represent an individual lease, owner or the like, having control of a portion of the entire building 2.

Utility 10 (which is depicted as a water utility but could be any utility as described above) supplies water to building 2 via pipeline 11. The water utility 10 has placed a Utility company meter 12 in the pipeline 11 to monitor the water flow into building 2 and thus calculate a water usage charge for the entire building 2. The pipeline 11 is split in to individual unit pipelines 11a, 11b and 11c which provide water to units 2a, 2b and 2c respectively.

In each of the unit pipelines there has been placed a pulse flow meter 20. The pulse flow meter 20 has a wired connection 21 for distribution of the flow water data from the flow meter 20 to a desired location. The wired connection 21 connects to receiving device 25. Receiving device 25 is designed for processing the signals from each of the flow meters 20 and storing the data individually for each meter. An individual user can access the stored data via user interface 26. The user interface 26 can also be utilized to zero out any of the data in the receiving unit set times enter passwords and the like as desired. The user interface could also print out a hard copy of any desired data.

In this embodiment of the present invention there is an internet connection device 30 connected to the receiving device 25. While in this embodiment the internet connection device 30 is shown as a separate attached device, the internet connection device could be inside the receiving device 25 and part of its circuitry is located, not attached, but relatively close with a wire connection between the two.

The internet connection device 30 can take the data stored in the receiving device 25 regarding water flow, and in this embodiment, transfer it to the internet 35. Once at the internet, users 36 can access the internet 35 and read the data or otherwise control the receiving unit like one can from the user interface 26.

The system of the present invention is represented by a dotted line 40 and comprises the apparatus and the building together.

Figure 2:
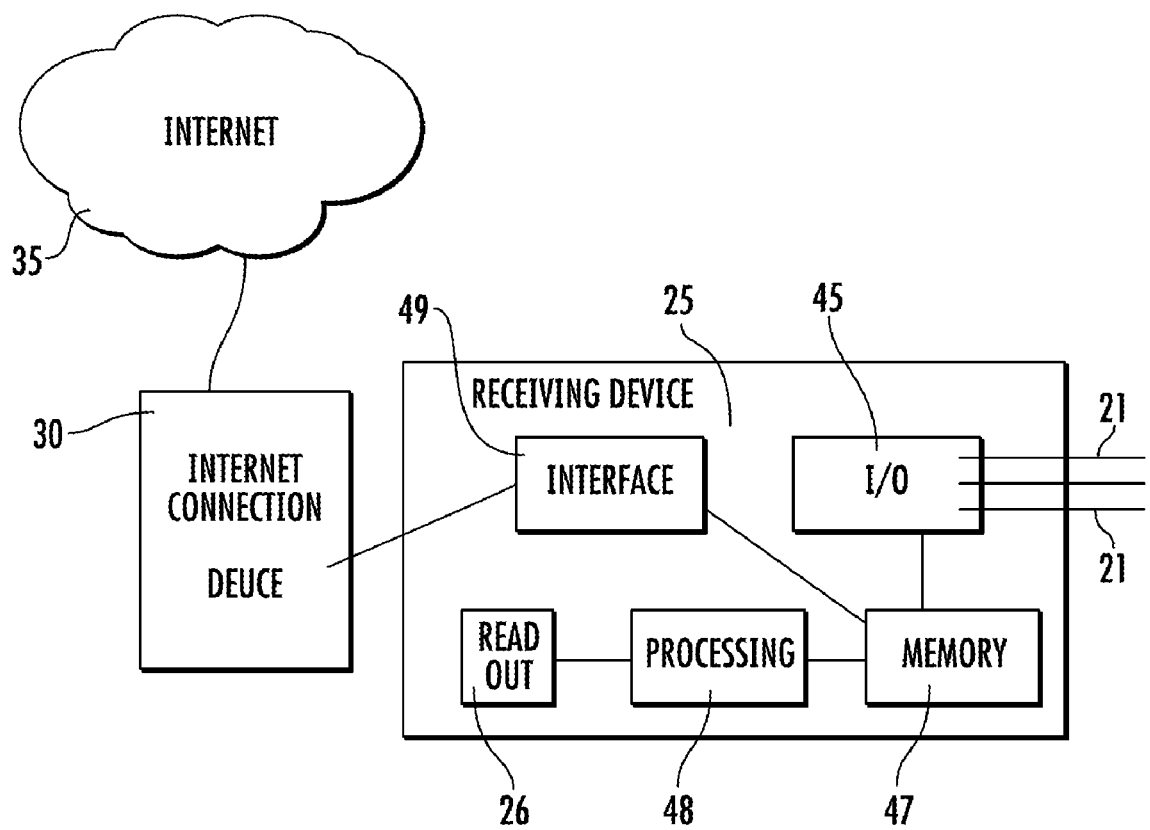
FIG. 2 is a relationship diagram of the present metering system invention.

In FIG. 2 there is shown an embodiment of the operation of a receiving device 25. The receiving device 25 has input output ports 45 for connection of the connecting wires 21 from the flow meters 20 shown in FIG. 1. The data is transferred to memory 47 for a variety of uses. In one flow path the data in memory 47 is transferred to a processing unit 48 which is responsible for converting data to readable form, performing reset time functions, and the like, as necessary for the receiving device 25.

As in FIG. 1 the receiving device 25 shown in FIG. 2 has a user readout 26 so that a selected individual can access the data stored in memory 47, reset data, calculate the water bill or prorated portion of the water bill, and the like. In the alternative the memory 47 stored data can be transferred to an interface 49. The interface then can connect to an internet connection device 30 which can then send the data to the internet. The data can be converted at an internet site or otherwise manipulated or the receiving device controlled as it can be at the readout 26.

It is clear that the above drawings are not intended to be limiting on the invention. Other methods of collecting and presenting data in the receiving device or otherwise selecting flow meters or other delivery means are within the contemplation of the present invention and the claims which follow are to be so read.

What is claimed is:

1. A method for metering utility consumption in a single building; divided into a plurality of individual units and the building serviced only by a single utility company utility meter; of each of the plurality of individual units within the building for the purpose of billing the occupant of each of the units their share of a bill received from the utility company that are not otherwise bill by the utility company for their share based on the single meter, the method comprising:
    a) identifying each of the individual units to be metered in the building;
    b) connecting a single pulse flow meter in-between the single utility meter and each identified unit, the flow meter consisting of a device capable of continuously sending a flow data signal via a wire;
    c) connecting a receiving device at the building for receiving the flow data signal via the wire from each of the identified individual units single flow meter and storing the data in the receiving device for each of the individual units;
    d) determining each units share of the buildings total utility usage;
    e) reading the data from a selected identified unit by a receiving device user; and
    f) determining the utility company charges for the single building and billing the occupant a share of the utility company bill based on their determined share of the building utility usage.

2. A method according to claim 1 wherein the receiving device can connect to a network device and transfer the stored data to the network.

3. A method according to claim 2 wherein the network is the internet.

4. A method according to claim 3 wherein the receiving device can be operated from a network connection.

5. A method according to claim 1 wherein the receiving device can be password protected.

6. A method according to claim 1 wherein the utility is the water utility.

7. A method according to claim 1 wherein the cost of the utility provided to the building is prorated to the individual units based on the proportion of utility use by each of the individual units.

8. An apparatus for metering the utility consumption in a single building; divided into a plurality of individual units and serviced by a single utility company utility meter; for each of a plurality of individual units within the building and billing the occupant of each of the units their share of a single bill received from the utility company based on the single meter comprising:
    a) a plurality of pulse flow meters capable of sending flow data via a wire wherein there is one flow meter per individual unit;
    b) a single receiving device for receiving flow data from each of the individual unit flow meters, capable of receiving the flow data signal via the wire from each of the identified individual units and storing the data in the receiving device for each of the individual units;
    c) a means within the receiving device for storing the flow data and reading the flow data by a receiving device user; and
    d) a means for utilizing the flow data in the receiving device for determining each units share of the single bill.

9. An apparatus according to claim 8 which further comprises a device for connecting to a network and transferring the data in the receiving device to the network.

10. An apparatus according to claim 9 wherein the network is the internet.

11. An apparatus according to claim 10 wherein the receiving device can be operated from the internet.

12. An apparatus according to claim 8 wherein the receiving device is password protected.

13. An apparatus according to claim 8 wherein the utility is the water utility.

14. An apparatus according to claim 8 wherein the receiving device can prorate the cost of the utility coming into the building and measured by the utility meter to each of the individual units in the apparatus.

15. A system for monitoring the utility usage in a plurality of individual units within a single building metered by a single utility company utility meter comprising:
    a) a building metered by a single utility company utility meter and divided into plurality of individual units;
    b) a single pulse flow meter positioned in-line between the utility meter and each of the individual units, each meter capable of sending flow data via a wire;
    c) a single receiving device for receiving flow data from each of the individual unit flow meters, capable of receiving the flow data signal via the wire from each of the identified individual units and storing the data in the receiving device for each of the individual units;
    d) a means within the receiving device for storing the flow data and reading the flow data by a receiving device user;
    e) a means for prorating utility usage measured by the utility water meter to each of the individual units.

16. A system according to claim 15 which further comprises a device connected to the receiving device for connecting to a network and delivering the stored flow data to the network.

17. A system according to claim 16 wherein the network is the internet.

18. A system according to claim 17 wherein the receiving device is controllable from the internet.

19. A system according to claim 15 wherein the receiving device is password protected.

20. A system according to claim 15 wherein the flow meter is a water pulse meter.

* * * * *